(12) United States Patent
Wright et al.

(10) Patent No.: US 10,109,176 B2
(45) Date of Patent: Oct. 23, 2018

(54) POWER GENERATION SHUTDOWN ALERT

(71) Applicant: FORD GLOBAL TECHNOLOGIES, LLC, Dearborn, MI (US)

(72) Inventors: Robert Wright, Royal Oak, MI (US); Walter Joseph Ortmann, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 897 days.

(21) Appl. No.: 14/189,080

(22) Filed: Feb. 25, 2014

(65) Prior Publication Data

US 2015/0243151 A1  Aug. 27, 2015

(51) Int. Cl.
*G08B 21/18* (2006.01)
*G08B 21/14* (2006.01)
(Continued)

(52) U.S. Cl.
CPC ............ *G08B 21/18* (2013.01); *B60L 3/0023* (2013.01); *B60L 11/14* (2013.01); *B60L 11/1816* (2013.01); *B60L 11/1842* (2013.01); *B60W 20/00* (2013.01); *G08B 21/14* (2013.01); *B60L 2240/70* (2013.01); *B60L 2250/16* (2013.01); *B60L 2260/26* (2013.01); *Y02E 60/721* (2013.01); *Y02T 10/70* (2013.01); *Y02T 10/7005* (2013.01); *Y02T 10/7072* (2013.01); *Y02T 10/7077* (2013.01); *Y02T 10/7291* (2013.01);
(Continued)

(58) Field of Classification Search
CPC .. B60L 11/14; B60L 11/1816; B60L 11/1842; B60L 2240/70; B60L 2250/16; B60L 2260/26; B60L 3/0023; B60L 1/00; B60L 1/003; B60L 1/006; B60L 1/02; B60L 1/04; B60L 1/06; B60L 1/08; B60L 1/10; B60L 1/12; B60L 1/14; B60L 1/16; B60W 20/00; G08B 21/14; G08B 21/18; Y02E 60/721; Y02T 10/70; Y02T 10/7005; Y02T 10/7072; Y02T 10/7077; Y02T 10/7291; Y02T 90/121; Y02T 90/128; Y02T 90/14; Y02T 90/16; Y02T 90/163; Y04S 10/126
See application file for complete search history.

(56) References Cited

U.S. PATENT DOCUMENTS 5,205,253 A    4/1993  Shelef et al.
7,231,994 B2*  6/2007  Buglione ................ B60K 6/26
                                          180/65.31
(Continued)

FOREIGN PATENT DOCUMENTS

WO    02074573 A2    9/2002
WO    2010029315 A2  3/2010

OTHER PUBLICATIONS

"Plug-In Hybrid Trucks Coming Soon," Oct. 16, 2013, Blog, In the News, Media, News, two pages, http://www.viamotors.com/news/consumer-reports-article-on-via-motors . . . .
(Continued)

*Primary Examiner* — Nay Tun
(74) *Attorney, Agent, or Firm* — Carlson, Gaskey & Olds

(57) ABSTRACT

A method according to an exemplary aspect of the present disclosure includes, among other things, communicating an alert to a location remote from a vehicle in response to disabling a Power Generation mode of the vehicle.

22 Claims, 6 Drawing Sheets

(51) Int. Cl.
   *B60L 3/00*     (2006.01)
   *B60L 11/14*    (2006.01)
   *B60L 11/18*    (2006.01)
   *B60W 20/00*    (2016.01)

(52) U.S. Cl.
   CPC ............ *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01)

(56) References Cited

U.S. PATENT DOCUMENTS

| | | | |
|---|---|---|---|
| 7,309,966 B2 * | 12/2007 | Wobben | B60L 11/1811 |
| | | | 318/139 |
| 7,619,319 B1 | 11/2009 | Hunter | |
| 7,690,456 B2 * | 4/2010 | Deng | B60K 6/26 |
| | | | 180/65.265 |
| 7,949,435 B2 | 5/2011 | Pollack et al. | |
| 7,960,857 B2 | 6/2011 | King | |
| 8,255,358 B2 | 8/2012 | Ballew et al. | |
| 9,126,544 B2 | 9/2015 | Larson et al. | |
| 2005/0109550 A1 * | 5/2005 | Buglione | B60K 6/26 |
| | | | 180/65.25 |
| 2006/0006846 A1 * | 1/2006 | Kishibata | H02J 7/1438 |
| | | | 322/28 |
| 2006/0103239 A1 * | 5/2006 | Kishibata | F02D 31/001 |
| | | | 307/10.1 |
| 2007/0085692 A1 * | 4/2007 | Grant | G08B 21/14 |
| | | | 340/632 |
| 2007/0151782 A1 * | 7/2007 | Buglione | B60K 6/26 |
| | | | 180/65.28 |
| 2007/0158120 A1 * | 7/2007 | Lee | B60K 6/26 |
| | | | 180/65.28 |
| 2007/0175680 A1 * | 8/2007 | Gouker | B60L 11/12 |
| | | | 290/40 C |
| 2007/0282495 A1 | 12/2007 | Kempton et al. | |
| 2009/0058097 A1 * | 3/2009 | Oyobe | B60K 6/46 |
| | | | 290/1 R |
| 2009/0140698 A1 * | 6/2009 | Eberhard | H02J 7/045 |
| | | | 320/152 |
| 2010/0133900 A1 * | 6/2010 | King | B60L 11/1816 |
| | | | 307/9.1 |
| 2010/0171588 A1 | 7/2010 | Chutorash et al. | |
| 2010/0252088 A1 | 10/2010 | Fein et al. | |
| 2010/0253145 A1 * | 10/2010 | King | B60L 1/006 |
| | | | 307/46 |
| 2010/0283625 A1 * | 11/2010 | Inagawa | G08C 17/00 |
| | | | 340/4.36 |
| 2011/0276448 A1 | 11/2011 | Perper et al. | |
| 2011/0307141 A1 | 12/2011 | Westerlage et al. | |
| 2012/0310547 A1 | 12/2012 | Cristoforo | |
| 2013/0018766 A1 | 1/2013 | Christman | |
| 2013/0169239 A1 * | 7/2013 | Iida | H02J 7/1492 |
| | | | 320/162 |
| 2014/0117677 A1 | 5/2014 | Fukuzawa | |
| 2015/0112522 A1 | 4/2015 | Liang et al. | |

OTHER PUBLICATIONS

"PG&E Shows Off Plug-In Work Truck That Could Power a Neighborhood," by: David Herron, Jul. 25, 2013, four pages.

"Dodge Ram Contractor Special Doubles Environmental Benefits With Hybrid Powertrain and Clear Auxiliary Power," Nov. 8, 2000, Auburn Hills/Stuttgart, two pages.

* cited by examiner

POWER GENERATION SHUTDOWN ALERT

TECHNICAL FIELD

This disclosure relates to an electrified vehicle, and more particularly, but not exclusively, to a system and method for communicating remote notification of Power Generation mode shutdown.

BACKGROUND

Electrified vehicles, such as hybrid electric vehicles (HEV's), plug-in hybrid electric vehicles (PHEV's), battery electric vehicles (BEV's), or fuel cell vehicles, differ from conventional motor vehicles in that they are powered by one or more electric machines (i.e., electric motors/generators) instead of or in addition to an engine. In other words, electrified vehicles may include more than one power source that can be used either individually or together to propel the vehicle.

Some electrified vehicles enable a driver to manually manage the vehicle's energy usage. For example, the electrified vehicle may be operated in electric vehicle (EV) mode where the electric machine powers the vehicle without assistance from the engine, or may be operated in hybrid (HEV) mode in which the engine is used in combination with the electric machine to power the vehicle. As electrified vehicles becomes more commonplace, additional energy management options may be desirable.

SUMMARY

A method according to an exemplary aspect of the present disclosure includes, among other things, communicating an alert to a location remote from a vehicle in response to disabling a Power Generation mode of the vehicle.

In a further non-limiting embodiment of the foregoing method, the vehicle is a hybrid electric vehicle (HEV).

In a further non-limiting embodiment of either of the foregoing methods, the method includes controlling the vehicle in the Power Generation mode only if the vehicle is in park.

In a further non-limiting embodiment of any of the foregoing methods, the controlling step includes at least controlling an engine and an electric machine to generate the power supplied during the Power Generation mode.

In a further non-limiting embodiment of any of the foregoing methods, the disabling step is performed in response to a detected carbon monoxide level exceeding a threshold carbon monoxide level.

In a further non-limiting embodiment of any of the foregoing methods, the disabling step is performed in response to exceeding predefined energy usage limits of the vehicle.

In a further non-limiting embodiment of any of the foregoing methods, the method includes entering energy usage limits for limiting a total amount of energy consumed during the Power Generation mode.

In a further non-limiting embodiment of any of the foregoing methods, the method includes performing a series of periodic system checks to monitor a total energy usage of the vehicle during the Power Generation mode.

In a further non-limiting embodiment of any of the foregoing methods, the disabling step is performed in response to at least one of the following occurring: exceeding a fuel consumption limit, exceeding an energy consumption limit, exceeding a time usage limit or detecting a vehicle failure mode.

In a further non-limiting embodiment of any of the foregoing methods, the communicating step includes sending the alert to a computing device.

A vehicle control method according to another exemplary aspect of the present disclosure includes, among other things, operating a vehicle in a Power Generation mode to supply power to an electrical accessory separate from the vehicle, disabling the Power Generation mode in response to a predefined condition and communicating an alert to a location remote from the vehicle in response to disabling the Power Generation mode.

In a further non-limiting embodiment of the foregoing method, the predefined condition includes exceeding predefined energy usage limits of the vehicle.

In a further non-limiting embodiment of either of the foregoing methods, the predefined condition includes a detected carbon monoxide level exceeding a threshold carbon monoxide level.

In a further non-limiting embodiment of any of the foregoing methods, the alert includes a phone call, a text message or an email sent to a computing device located remotely from the vehicle.

In a further non-limiting embodiment of any of the foregoing methods, the communicating step includes wirelessly sending the alert to a computing device over a cellular network.

A system according to another exemplary aspect of the present disclosure includes, among other things, an engine, a control unit in communication with the engine and configured to control the engine in a Power Generation mode and an alert system that provides remote notification of shutdown of the Power Generation mode.

In a further non-limiting embodiment of the foregoing system, a driver interface provides selection of various vehicle operating modes including the Power Generation mode.

In a further non-limiting embodiment of either of the foregoing systems, the alert system includes a communication system that comprises a transceiver.

In a further non-limiting embodiment of any of the foregoing systems, a carbon monoxide detection system includes a sensor that measures ambient levels of carbon monoxide in the area of the system.

In a further non-limiting embodiment of any of the foregoing systems, the alert system provides the remote notification in the form of an alert communicated to a computing device.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a Power Generation shutdown alert system for an electrified vehicle. An alert may be communicated to a location remote from the vehicle in response to disabling a Power Generation mode of the vehicle. The Power Generation mode could be shutdown in response to a predefined condition. Non-limiting examples of predefined conditions include detecting a vehicle failure mode, detecting high carbon monoxide levels, and/or detecting that predetermined energy usage limits have been reached. These and other features are discussed in greater detail herein.

Figure 1:
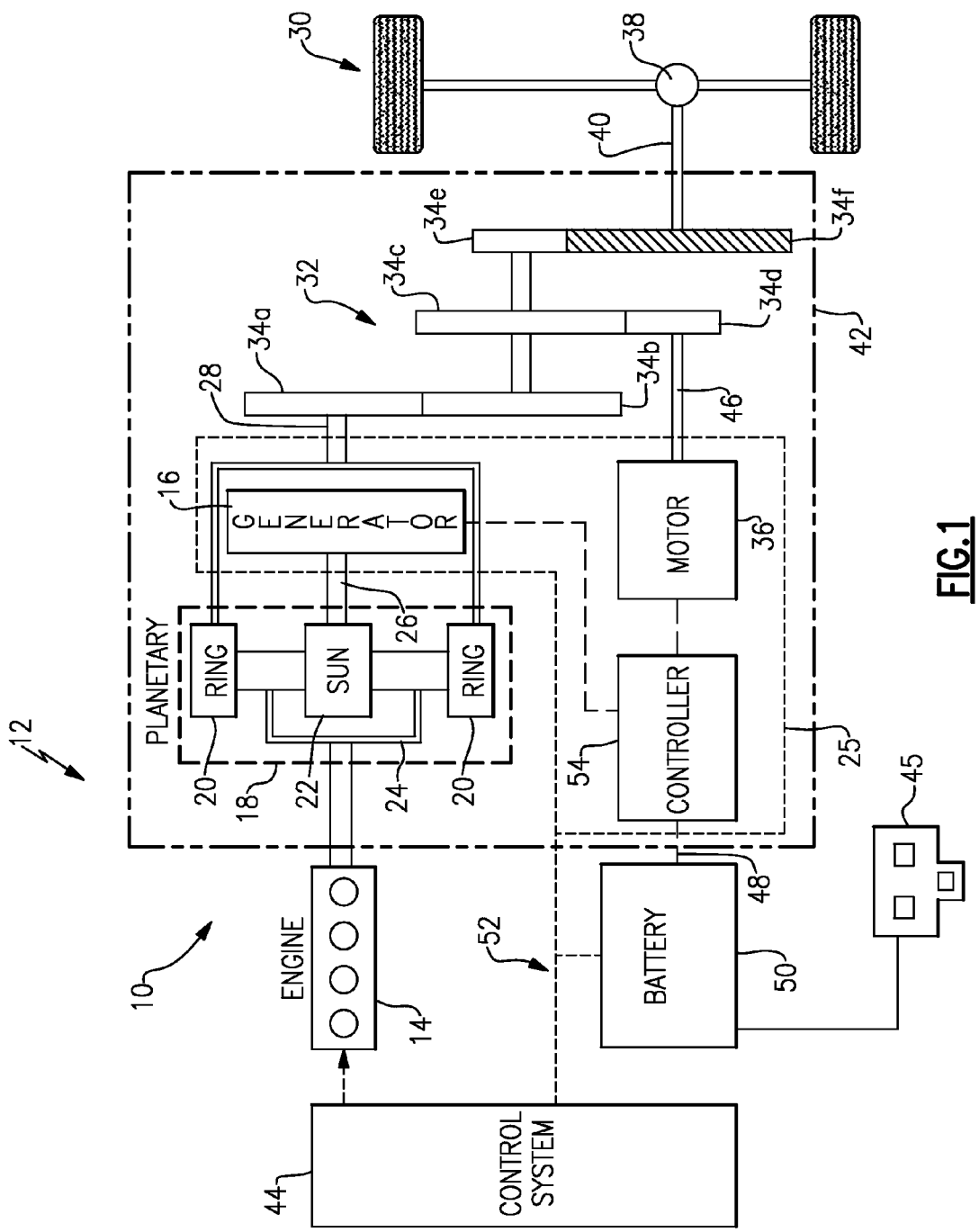
FIG. 1 schematically illustrates a powertrain of an electrified vehicle.

FIG. 1 schematically illustrates a powertrain 10 for an electrified vehicle 12 that is capable of implementing the Power Generation shutdown alert system and methods of this disclosure. It should be understood that the concepts described herein are not limited to HEV's and could extend to other electrified vehicles, including but not limited to PHEV's.

In one embodiment, the powertrain 10 is a power split system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electrified vehicle 12.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50.

The battery 50 may be a high voltage battery that is capable of outputting electrical power to operate the motor 36 and the generator 16. Other types of energy storage devices and/or output devices can also be incorporated for use by the electrified vehicle 12. In a non-limiting PHEV embodiment of the electrified vehicle 12, the battery 50 may be recharged or partially recharged using a charging adapter 45 that is connected to a charging station powered by an external power source, such as an electrical grid, a solar panel, or the like.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 could also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

In one non-limiting embodiment, the electrified vehicle 12 has two basic operating modes. The electrified vehicle 12 may operate in an Electric Vehicle (EV) mode where the motor 36 is used (generally without assistance from the engine 14) for vehicle propulsion, depleting the battery 50 state of charge up to its maximum allowable discharging rate under certain driving patterns/cycles. The EV mode is an example of a charge depleting mode of operation for the electrified vehicle 12. During EV mode, the state of charge of the battery 50 may increase in some circumstances, for example due to a period of regenerative braking. The engine 14 is generally not permitted to operate under a default EV mode, but may need to be operated based on a vehicle system state or as permitted by the operator.

The electrified vehicle 12 may additionally be operated in a Hybrid (HEV) mode in which the engine 14 and the motor 36 are both used for vehicle propulsion. The HEV mode is an example of a charge sustaining mode of operation for the electrified vehicle 12. During the HEV mode, the electrified vehicle 12 may reduce the motor 36 propulsion usage to be able to maintain the state of charge of the battery 50 at a constant or approximately constant level by increasing the engine 14 propulsion usage.

Figure 2:
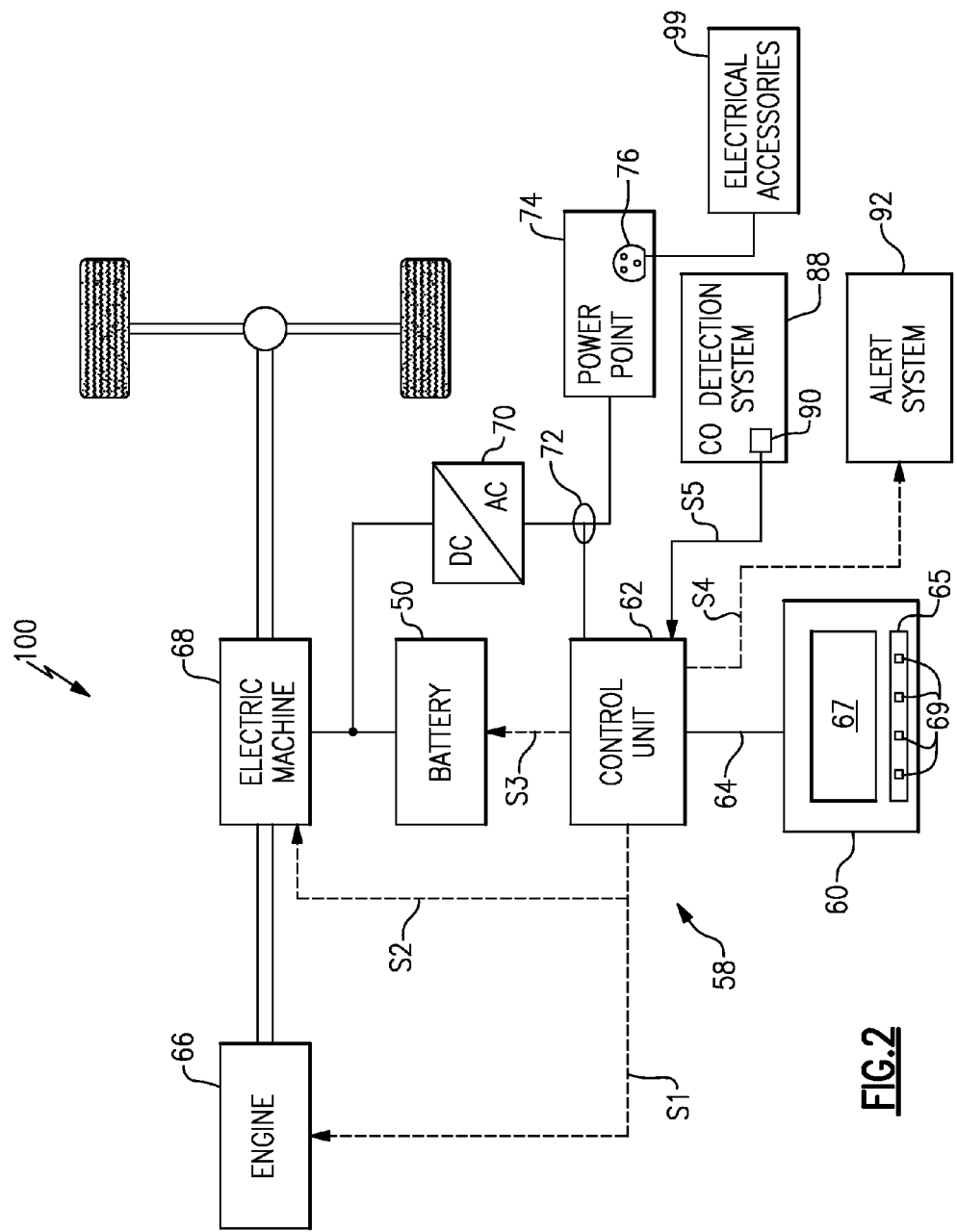
FIG. 2 illustrates a vehicle system that can be employed within an electrified vehicle.

FIG. 2 illustrates a vehicle system 58 that can be used to control a vehicle 100. The vehicle 100 could be an electrified vehicle similar to that shown in FIG. 1. In one non-limiting embodiment, the vehicle system 58 is employed to control operation of HEV's, although any electrified vehicle may be controlled using the vehicle system 58.

The vehicle 100 includes an engine 66 and an electric machine 68. Although not shown, the engine 66 may be mechanically disconnected from the electric machine 68, such as during EV mode, via a disconnect clutch such that the vehicle 100 is propelled solely by the electric machine 68. Alternatively, in a HEV mode, both the engine 66 and electric machine 68 are employed to propel the vehicle 100. Although only a single electric machine 68 is shown, the vehicle 100 could include multiple electric machines within the scope of this disclosure.

In addition to the EV and HEV operating modes described above, the vehicle 100 may be operated in a Power Generation mode (hereinafter referred to as "GEN mode"). In GEN mode, the engine 66 and/or the electric machine 68 generate power for use by the driver/operator for purposes other than propelling the vehicle 100. When GEN mode is selected, the engine 66 drives the electric machine 68 to generate electrical power. The electrical power is routed to a power point 74 for distribution to one or more electrical accessories 99. Once the battery 50 reaches a full state of charge, operation of the engine 66 may be terminated (i.e., the engine 66 is commanded OFF). The engine 66 may be commanded ON again at a later time to drive the electric machine 68 in order to generate additional electric power if the battery 50 state of charge is depleted to a relatively low level.

In one embodiment, electrical power may be supplied for powering various electrical accessories 99 (shown schematically) by operating the vehicle 100 in GEN mode. The electrical accessories 99 could include various tools that a contractor utilizes at a work site, such as saws, drills, pumps or any other powered equipment. Other equipment may also be powered by operating the vehicle 100 in GEN mode. In another embodiment, the electrical accessories 99 are devices that are separate from the vehicle 100. In yet another embodiment, the electrical accessory 99 may be a home, business or other building or structure in need of electrical power.

The vehicle system 58 may include a driver interface 60 and a control unit 62 in electrical communication with the driver interface 60. The driver interface 60 may include a user input 65 and a display 67, which are shown schematically in this embodiment. The user input 65 may include a touch screen and/or a series of tactile buttons 69 for entering information. The display 67 may include a touch screen and/or a series of gauges for displaying information to the driver.

Using the driver interface 60, the driver or another operator may request control of the vehicle 100 in GEN mode. The driver interface 60 is generally located inside the vehicle 100, such as within the in-dash entertainment center of the vehicle passenger cabin. The information input into the driver interface 60 may be communicated to the control unit 62 over an electrical connection 64.

The control unit 62 may be part of the control system 44 (see FIG. 1), may be part of a powertrain or transmission control system, or could be a standalone unit in communication with one or more additional controllers, including but not limited to an engine control module, an electric motor control module, a transmission control module and/or a battery control module. The control unit 62 may communicate with other controllers, modules and/or components over the CAN 52 (see FIG. 1), in one embodiment.

The vehicle system 58 may additionally include a converter 70, a sensor 72 and a power point 74. The converter 70 converts DC power from the electric machine 68 to AC power that is supplied to the power point 74. The sensor 72 measures voltage and current information of the power communicated to the power point 74 and communicates this information to the control unit 62. This voltage and current information may be utilized by the control unit 62 to determine the energy usage of the vehicle 100, as is further discussed below.

The power point 74 may include one or more power outlets 76. The operator of the vehicle 100 may plug any tools or other electrical accessories 99 into the power outlets 76 in order to power these tools using energy provided by the vehicle 100 during GEN mode.

The vehicle system 58 may optionally include a carbon monoxide (CO) detection system 88 that is located on-board the vehicle 100. The CO detection system 88 may include a CO sensor 90 that is adapted to detect the concentration or level of carbon monoxide in the ambient air that surrounds the vehicle 100. The CO sensor 90 may be located anywhere on the vehicle 100 that is capable of sampling ambient air that surrounds the vehicle 100. The CO sensor 90 can transmit measured levels of carbon monoxide to the control unit 62, such as via a signal S5. The control unit 62 may be programmed to store a threshold CO level and compare the measured level of carbon monoxide received from the CO sensor 90 to the threshold level.

The vehicle 100 may additionally be equipped with an alert system 92. The control unit 62 may command the alert system 92 to issue an alert to the vehicle operator in response to disabling GEN mode. The alert provides the vehicle owner/operator with remote knowledge of GEN mode shutdown. Providing remote knowledge of GEN mode shutdown can be important in situations where the vehicle 100 is being used to perform relatively important tasks that may include, by way of non-limiting examples, powering a pump to remove water from a home or building or powering a lighting/ventilation system at a construction site.

The control unit 62 may be programmed with one or more algorithms that are operative to control the vehicle 100 in GEN mode, estimate energy usage associated with operating the vehicle 100 in GEN mode, monitor CO levels of the vehicle 100, and issue GEN mode shutdown alerts. In one embodiment, the control unit 62 can communicate control signals S1 to the engine 66, control signals S2 to the electric machine 68, control signals S3 to the battery 50, and control signals S4 to the alert system 92 for scheduling, controlling and disabling operation of the vehicle 100 in GEN mode.

Figure 3:
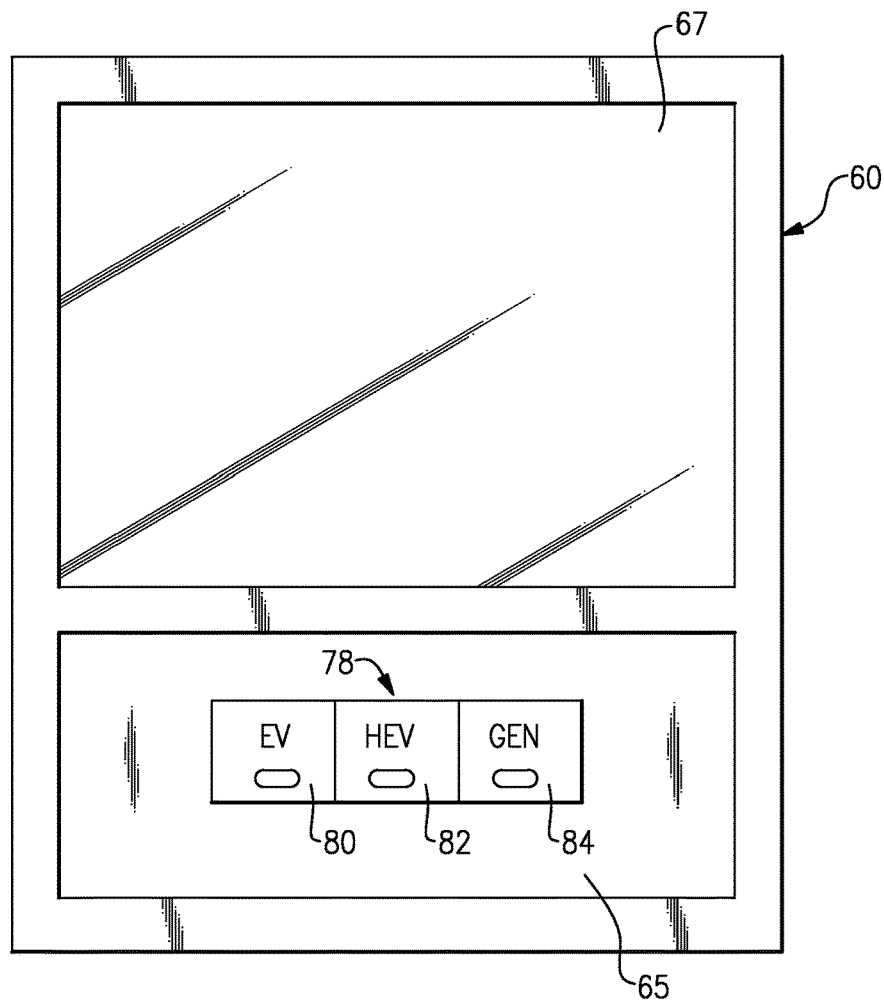
FIG. 3 illustrates a driver interface of a vehicle system.

FIG. 3 illustrates one non-limiting embodiment of an exemplary driver interface 60 of a vehicle system 58. The driver interface 60 may include a user input 65 and a display 67. The user input 65 may include various actuators, selectors, switches or the like for inputting driver preferences for managing the energy usage of an electrified vehicle.

In one embodiment, the user input 65 of the driver interface 60 includes a mode selector 78 that allows the driver/operator to select an operating mode preference for controlling and operating the vehicle. The mode selector 78 may include an EV mode button 80 for selecting EV mode, a HEV mode button 82 for selecting HEV mode, and a GEN mode button 84 for selecting GEN mode. Of course, these are intended as non-limiting embodiments of possible energy management modes. It should additionally be understood that driver interface 60 could include other features and functions within the scope of this disclosure.

Figure 4:
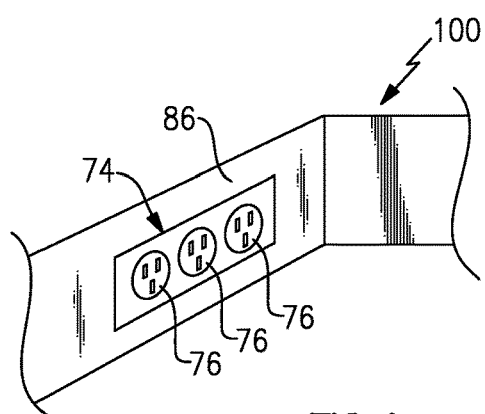
FIG. 4 illustrates a power point of a vehicle system.

FIG. 4 illustrates one non-limiting embodiment of a power point 74 of the vehicle system 58. The power point 74 may be mounted to an exposed wall 86 of a vehicle 100. The exposed wall 86 can be located anywhere on the vehicle 100, including but not limited to within a trunk, cargo area, cargo bed, etc. The exposed wall 86 is generally positioned at an easily accessible location of the vehicle 100. And may be either an external wall or an internal wall. Although only a single power point 74 is shown in FIG. 4, it should be understood that the vehicle 100 could be equipped with multiple power points.

The power point 74 includes power outlets 76. The power outlets 76 are ports for connecting and powering equipment that is separate from that located on the vehicle 100. In one non-limiting embodiment, the power outlets 76 supply 120/240 volt AC power at 50/60 Hz to electrical accessories plugged into the power outlets 76.

Figure 5:
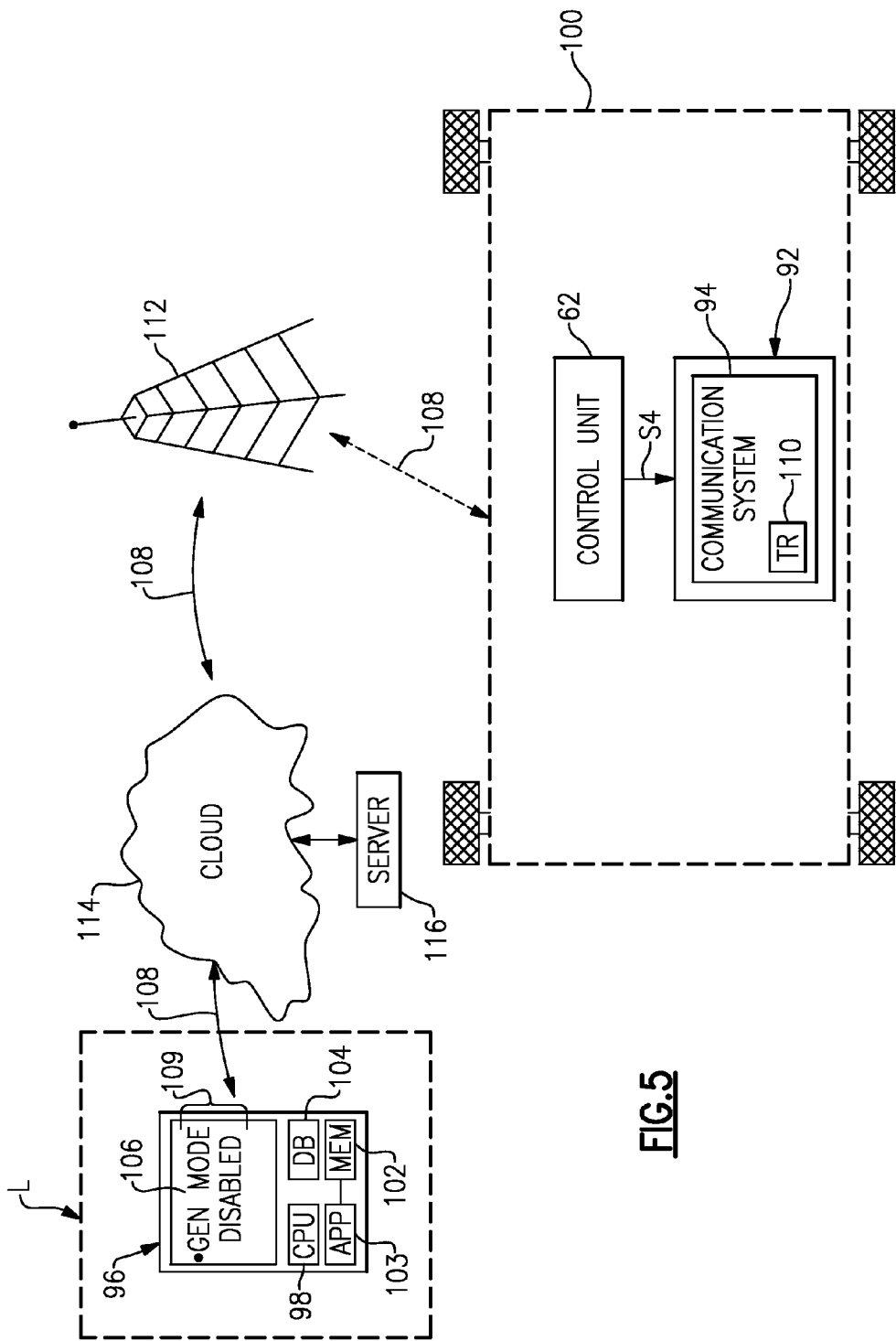
FIG. 5 illustrates an exemplary alert system for an electrified vehicle.

FIG. 5 illustrates an exemplary alert system 92 that may be employed by a vehicle 100, such as the electrified vehicles described above. The alert system 92 may communicate an alert 108 to a location L that is remote from the vehicle 100. The alert 108 indicates to the owner/operator of the vehicle 100 that GEN mode has been disabled. The GEN mode may be disabled in response to any of a variety of predefined conditions, several non-limiting examples of which are further discussed below with respect to FIGS. 6 and 7.

The alert system 92 includes a communication system 94 adapted to send and/or receive information to/from other components, such as the control unit 62 of the vehicle 100 or a computing device 96 that can be operated by a user (i.e., the owner/operator of the electrified vehicle). In one embodiment, the computing device 96 is located remotely from the vehicle 100 and the communication system 94 is part of, or on-board of, the vehicle 100.

The remotely located computing device 96 may be in the form of a personal computer, a tablet, a smartphone or any other portable computing device. The computing device 96 may be equipped with a central processing unit (CPU) 98 capable of executing a software application (APP) 103 loaded in program memory 102. A database 104 locally stores user data on the computing device 96. The user may access or send information on the computing device 96 using the APP 103 or by accessing a website or series of websites (such as www.syncmyride.com, for example) via a web browser. The computing device 96 may additionally include a display 106 for displaying information to the user, such as a message 109 that is associated with the alert 108 sent by the alert system 92.

In one non-limiting embodiment, the control unit 62 of the vehicle 100 may communicate a control signal S4 to the alert system 92 in response to GEN mode shutdown to command that the alert 108 be sent. The communication system 94 of the alert system 92 may then communicate the alert 108 to the computing device 96. In one embodiment, the communication system 94 includes the SYNC system manufactured by THE FORD MOTOR COMPANY. However, this disclosure is not limited to this exemplary system. The communication system 94 may include a transceiver 110 for bidirectional communication with a cellular tower 112 or other device. Although not necessarily shown or described in this highly schematic embodiment, the communication system 94 could include numerous other components within the scope of this disclosure.

The alert 108 may be transferred over the cloud 114 (i.e., the internet) to a server 116. The data associated with the alert 108 may be communicated to the computing device 96 via a wired, wireless or a cellular network. The server 116 may identify, collect and store user data from the computing device 96 for later validation purposes. Upon an authorized request, the data may be subsequently transmitted to the computing device 96 from the communication system 94 via the cellular tower 112. Other communication techniques are also contemplated as within the scope of this disclosure, including but not limited to, satellite, Wi-Fi and other techniques.

As explained in greater detailed below, the alert 108 that is transmitted to the computing device 96 provides remote notification that GEN mode of the vehicle 100 has been disabled. In one embodiment, the alert 108 may be in the form of a phone call (i.e., an audible alert). In another embodiment, the alert 108 may be in the form of a text message or an email that is sent to the computing device 96. In yet another embodiment, the alert 108 may be a message that is associated with and displayed as part of the APP 103 of the computing device 96. It should be understood that any type of alert may be communicated from the alert system 92 to the computing device 96.

Figure 6:
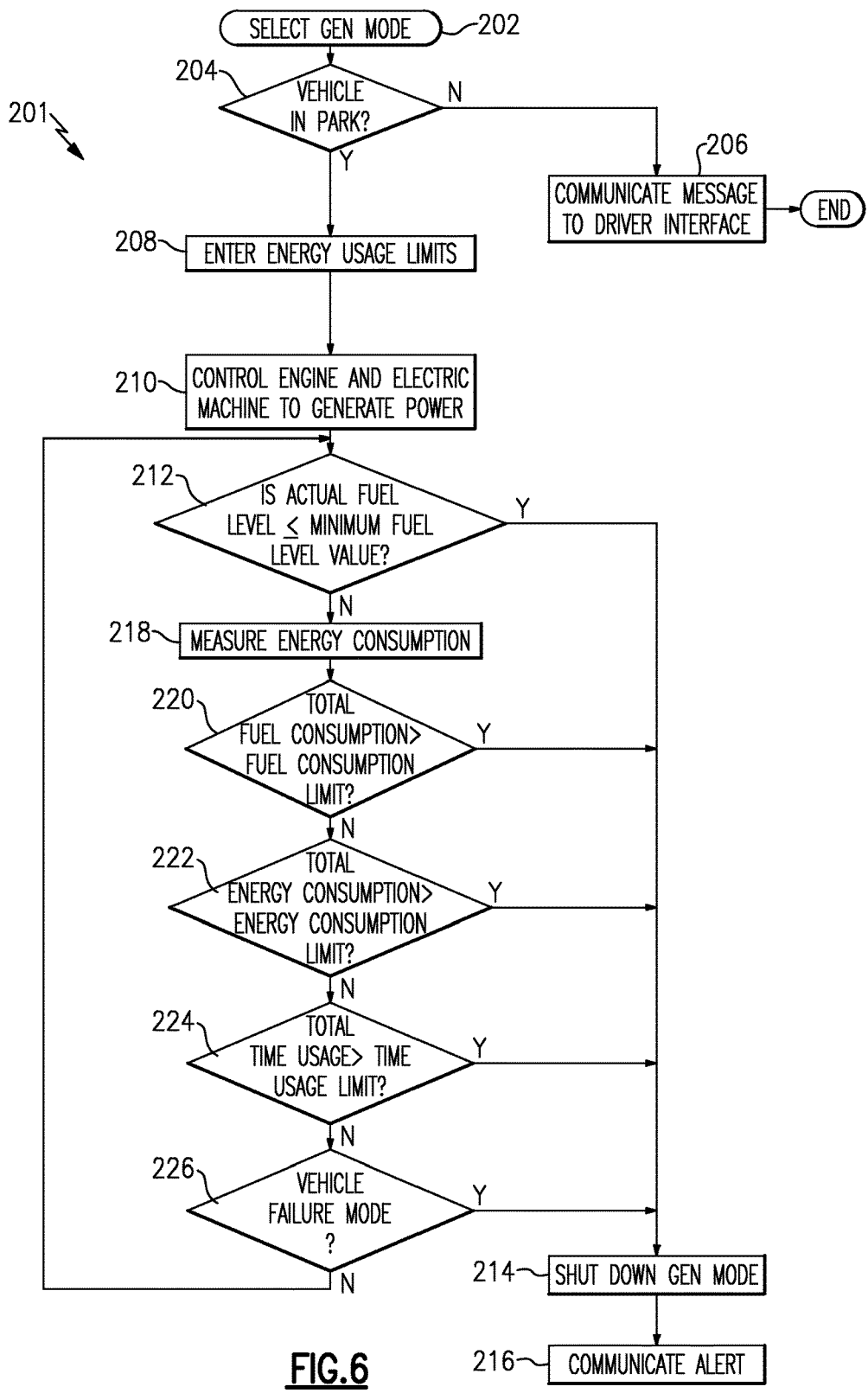
FIG. 6 schematically illustrates a vehicle control strategy according to a first embodiment of this disclosure.

FIG. 6, with continued reference to FIGS. 1-5, schematically illustrates a control strategy 201 for communicating a GEN mode shutdown alert. Other control strategies may also be implemented and executed by the vehicle 100 within the scope of this disclosure.

The exemplary control strategy 201 begins at block 202 in response to a selection of GEN mode. For example, the GEN mode may be selected on the driver interface 60 by actuating the GEN mode button 84 (see FIG. 3).

Next, at block 204, the control unit 62 of the vehicle system 58 confirms whether or not the vehicle 100 is in park. In one embodiment, the vehicle 100 can operate in GEN mode only if the vehicle 100 is in park. If it is determined that the vehicle 100 is not in park, a message can be communicated to the driver interface 60 and displayed on the display 67 at block 206 to instruct the driver/operator of the current unavailability of GEN mode. For example, the message could read "GEN MODE ONLY AVAILABLE WHILE PARKED" or some other similar message.

If the vehicle is in park, the control strategy 201 may proceed to block 208. At block 208, the driver/operator may enter various energy usage limits using the driver interface 60. The energy usage limits are limits the driver/operator wishes to impose on the amount of energy that is expended during operation in GEN mode. For example, the driver/ operator may set limits on the total amounts of fuel consumption, energy consumption, and time usage of operating the vehicle in GEN mode. In another embodiment, the driver/operator may select a minimum fuel level value, which once reached, will trigger the control unit 62 to shutdown GEN mode. These are intended as non-limiting examples of the types of energy usage limits that may be set by the driver/operator.

The engine 66 and electric machine 68 are controlled to generate power at block 210. Electrical power may be supplied to the power point 74 (see FIGS. 2 and 4) for powering various electrical accessories 99 by operating the vehicle 100 in GEN mode. The driver/operator may plug the electrical accessories 99 into the power outlets 76 of the power point 74 as desired in order to supply power to this equipment.

Beginning with block 212, the control strategy 201 may undertake a series of periodic system checks for monitoring the energy usage of the vehicle 100 during GEN mode. For example, the control unit 62 may compare an actual fuel level of the engine 66 to the minimum fuel level value set at block 208. If the actual fuel level is less than or equal to the minimum fuel level value set at block 208, the control strategy 201 proceeds to block 214 and disables or shuts down GEN mode. If GEN mode is disabled, the alert system 92 communicates an alert 108 to a computing device 96 located remotely from the vehicle 100 at block 216.

Alternatively, if the minimum fuel level value has not been reached, the control strategy 201 may proceed to block 218 by measuring total energy consumption of the vehicle 100 during GEN mode. For example, the control unit 62 may measure total fuel consumption by the engine 66, total energy consumption by the electric machine 68, and elapsed time that has occurred since GEN mode was selected at block 202. In one non-limiting embodiment, the measurement of the total energy consumption by the electric machine 68 is based on voltage and current readings of the sensor 72 (see FIG. 2).

Next, at block 220, the total fuel consumption that has occurred to that point during GEN mode is compared to the fuel consumption limit established at block 208. If the total fuel consumption exceeds the set threshold limit, GEN mode is shut down at block 214 and an alert 108 is communicated at block 216.

If the fuel consumption limit has not yet been reached, the control strategy 201 proceeds to block 222 where the total energy consumption (in Watt-hours of energy output) is compared to the energy consumption limit set at block 208. GEN mode is disabled at block 214 and an alert 108 is communicated at block 216 where the total energy consumption limit has been exceeded.

If the energy consumption limit has not yet been reached, the control strategy 201 may proceed to block 224 where the total time usage is compared to the time usage limit previously set at block 208. If the time usage limit has been exceeded, GEN mode is then shut down at block 214 and an alert 108 is communicated at block 216.

The control strategy 201 may also check whether any vehicle failure modes (e.g., engine 66 or electric machine 68 errors) have occurred during operation of the vehicle 100 in GEN mode at block 226. If so, GEN mode is then shut down at block 214 and an alert 108 is communicated at block 216. If no failure modes are detected and no limits have been exceeded, the control strategy 201 returns to block 212 where periodic system checks can be repeated as scheduled by the control unit 62.

Figure 7:
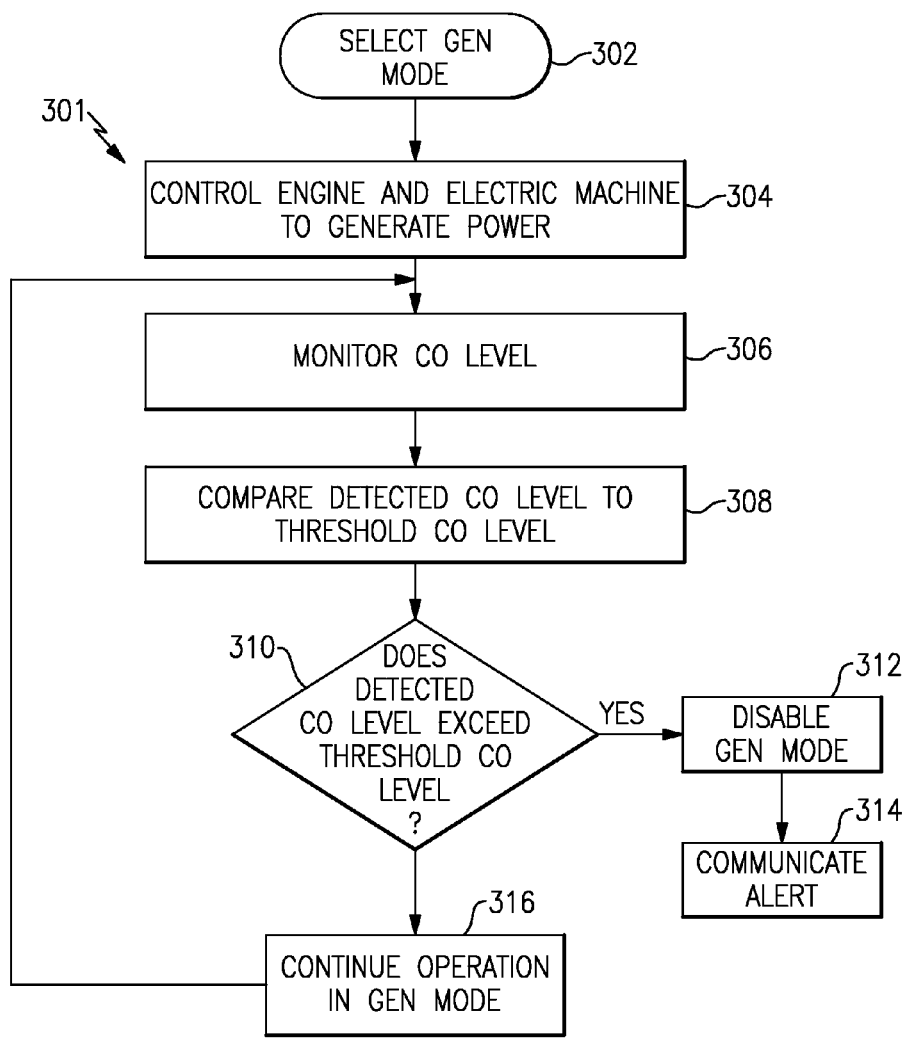
FIG. 7 schematically illustrates a vehicle control strategy according to a second embodiment of this disclosure.

FIG. 7, with continued reference to FIGS. 1-5, schematically illustrates another control strategy 301 for communicating GEN mode shutdown alerts associated with the vehicle 100. The control strategy 301 may begin at block 302 in response to a selection of GEN mode. Next, at block 304, the engine 66 and electric machine 68 are controlled to generate power. Electrical power may be supplied to the power point 74 (see FIGS. 2 and 4) for powering various electrical accessories 99 by operating the vehicle 100 in GEN mode. The driver/operator may plug the electrical accessories 99 into the power outlets 76 of the power point 74 as desired in order to supply power to this equipment.

Next, at block 306, carbon monoxide level in the area around the vehicle 100 may be monitored. In one embodiment, the carbon monoxide levels are measured by the CO sensor 90 of the CO detection system 88 and are then communicated to the control unit 62.

At block 308, the detected CO level may be compared to a threshold CO level. In the event that the detected CO level exceeds the threshold CO level at block 310, GEN mode is shutdown at block 312 and an alert is communicated to a location remote from the vehicle 100 at block 314. Operation of the vehicle 100 may continue in GEN mode at block 316 if the detected CO level does not exceed the threshold level at block 310.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling a vehicle in a Power Generation mode by commanding an engine and an electric machine of the vehicle to generate and supply power to an electrical accessory separate from the vehicle, and controlling the vehicle includes communicating an alert to a location remote from the vehicle in response to disabling the Power Generation mode of the vehicle.

2. The method as recited in claim 1, wherein the vehicle is a hybrid electric vehicle (HEV).

3. The method as recited in claim 1, comprising controlling the vehicle in the Power Generation mode only if the vehicle is in park.

4. The method as recited in claim 1, wherein the disabling step is performed in response to a detected carbon monoxide level exceeding a threshold carbon monoxide level.

5. The method as recited in claim 1, wherein the disabling step is performed in response to exceeding predefined energy usage limits of the vehicle.

6. The method as recited in claim 1, comprising entering energy usage limits for limiting a total amount of energy consumed by the engine and the electric machine during the Power Generation mode.

7. The method as recited in claim 1, comprising performing a series of periodic system checks to monitor a total energy usage of the engine and the electric machine of the vehicle during the Power Generation mode.

8. The method as recited in claim 1, wherein the disabling step is performed in response to at least one of the following occurring:
exceeding a fuel consumption limit;
exceeding an energy consumption limit;
exceeding a time usage limit; or
detecting a vehicle failure mode.

9. The method as recited in claim 1, wherein the communicating step includes sending the alert to a computing device.

10. The method as recited in claim 1, wherein the power generated during the Power Generation mode is supplied to a power point located on the vehicle which the electrical accessory is connectable to.

11. A vehicle control method, comprising:
operating a vehicle in a Power Generation mode by controlling an engine and an electric machine of the vehicle to supply power to an electrical accessory separate from the vehicle;
monitoring a total fuel consumption of the engine and a total energy consumption of the electric machine, wherein the total energy consumption is the amount of energy the electric machine consumes from a battery when powering the electrical accessory;
disabling the Power Generation mode if a fuel consumption limit or an energy consumption limit has been exceeded; and
communicating an alert to a location remote from the vehicle in response to disabling the Power Generation mode.

12. The method as recited in claim 11, comprising disabling the Power Generation mode if a detected carbon monoxide level exceeds a threshold carbon monoxide level.

13. The method as recited in claim 11, wherein the alert includes a phone call, a text message or an email sent to a computing device located remotely from the vehicle.

14. The method as recited in claim 11, wherein the communicating step includes wirelessly sending the alert to a computing device over a cellular network.

15. The method as recited in claim 11, comprising:
monitoring a total time usage associated with the Power Generation mode; and
disabling the Power Generation mode if a time usage limit has been exceeded.

16. The method as recited in claim 11, comprising:
monitoring the vehicle for any failure modes associated with the engine or the electric machine; and
disabling the Power Generation mode if the failure mode has been detected.

17. A vehicle system, comprising:
an engine;
an electric machine;
a control unit in communication with said engine and said electric machine and configured to control said engine and said electric machine in a Power Generation mode in which power is generated and supplied to an electrical accessory separate from the vehicle system; and
an alert system that provides remote notification of shutdown of said Power Generation mode.

18. The vehicle system as recited in claim 17, comprising a driver interface that provides selection of various vehicle operating modes including said Power Generation mode.

19. The vehicle system as recited in claim 17, wherein said alert system includes a communication system that comprises a transceiver.

20. The vehicle system as recited in claim 17, comprising a carbon monoxide detection system that includes a sensor that measures ambient levels of carbon monoxide in the area of said system.

21. The vehicle system as recited in claim 17, wherein said alert system provides said remote notification in the form of an alert communicated to a computing device.

22. The vehicle system as recited in claim 17, comprising a power point mounted to a wall of the vehicle system, said electrical accessory connectable to a power outlet of said power point.

* * * * *